Dec. 13, 1960
G. E. PROCTOR
2,964,078
INSERTABLE TOOTH EDGER SAW
Filed Aug. 12, 1958
2 Sheets-Sheet 1
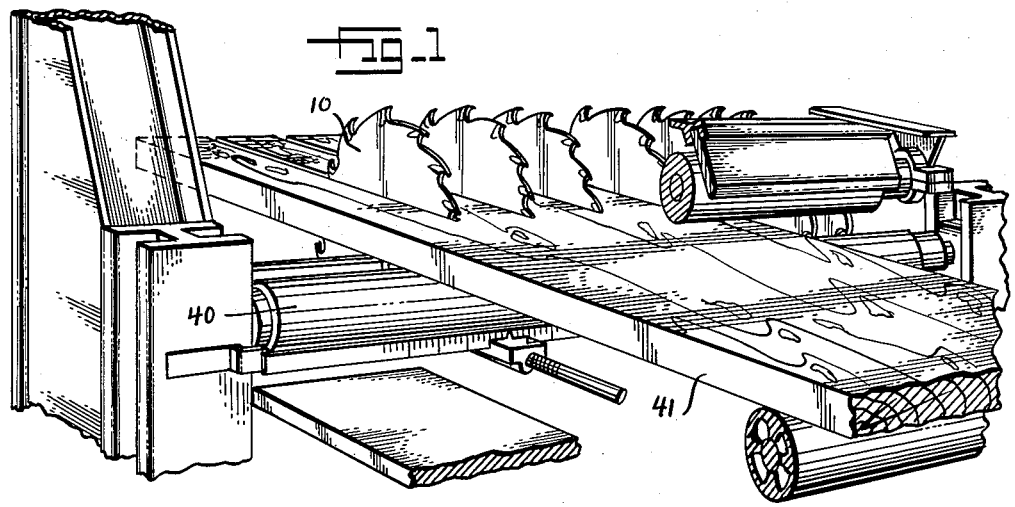
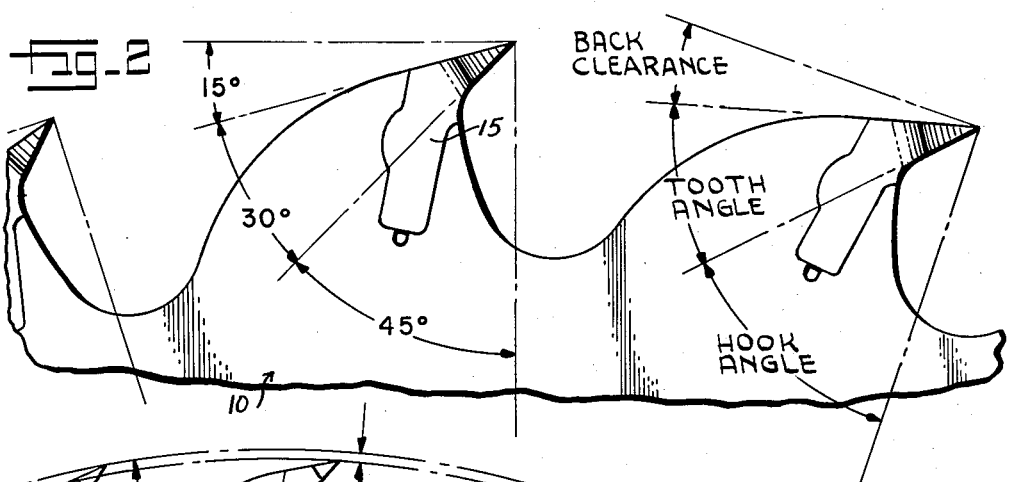
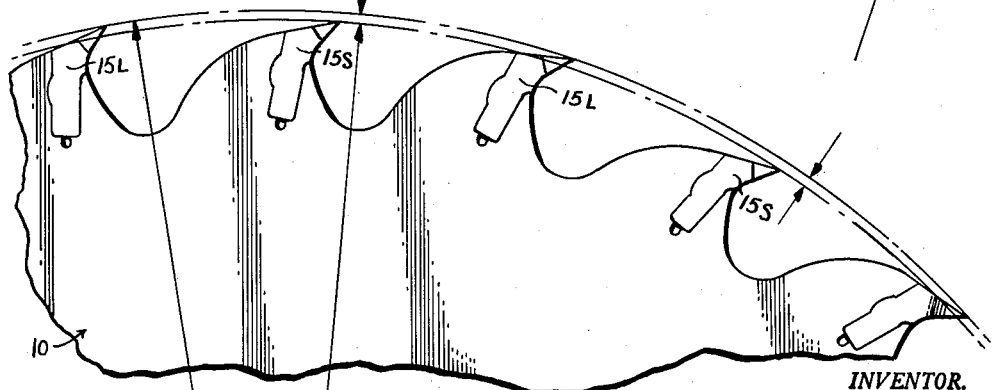
INVENTOR.
GLEN E. PROCTOR
BY
Barnes & Seed
Attorneys Dec. 13, 1960  G. E. PROCTOR  2,964,078
INSERTABLE TOOTH EDGER SAW
Filed Aug. 12, 1958  2 Sheets-Sheet 2
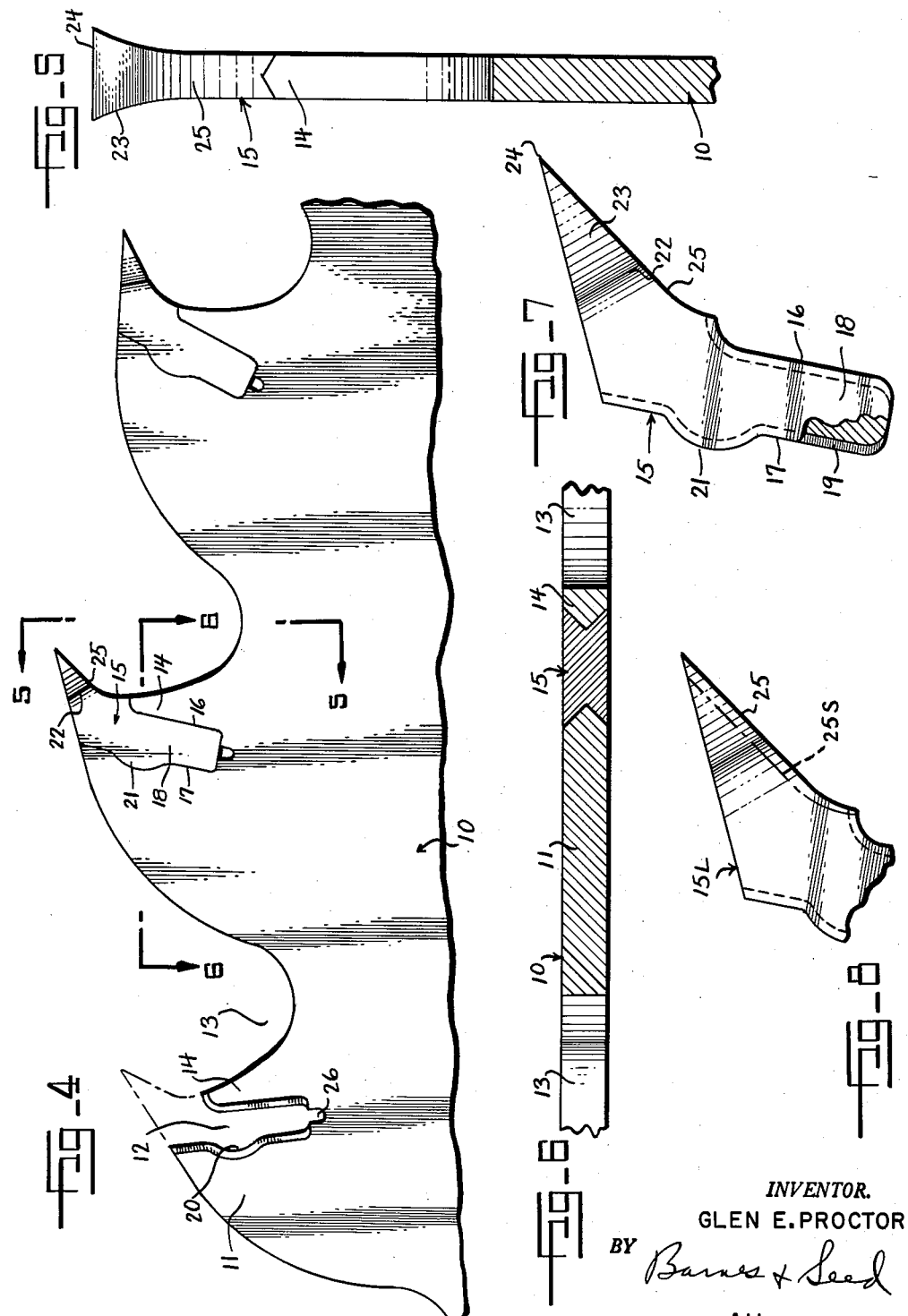
INVENTOR.
GLEN E. PROCTOR
BY *Barnes + Seed*
Attorneys

United States Patent Office 2,964,078
Patented Dec. 13, 1960

2,964,078

INSERTABLE TOOTH EDGER SAW

Glen E. Proctor, 603 Moulsby Lane, Everett, Wash.

Filed Aug. 12, 1958, Ser. No. 754,635

3 Claims. (Cl. 144—162)

This invention relates to edger saws, and especially insertable tooth edger saws of the type in which the teeth are self-anchoring, and namely, a saw having its blade formed with specially shaped sockets into which the anchor-butts of mating teeth are sprung. This perforce obviates need for camming shanks, rivets or any other supplementary anchor piece for locking the teeth to the blade. The present application is a continuation-in-part of my copending application Ser. No. 691,341, filed October 21, 1957, and now abandoned.

Camming shanks have several disadvantages including the reduction of the gullet for each tooth and the need for a wider kerf. The first of these disadvantages limits the possible feed speed of the slabs into the edger and the latter results in more sawdust waste. While this waste has been considered of little moment in the past, narrowing the kerf to raise the mill output from each log, even though such is only a minor fraction of the whole, is increasingly important as labor and timber costs continue to rise.

Even more important than narrowing the kerf is the need to either find more vital uses for the sawdust waste or to change the physical form of the waste into a more valuable product. The present invention takes the latter tack by aiming to provide an edger saw whose kerf output will have a large percentage of wood chips which are readily marketable for processing to wood pulp. In this regard a further object is to provide an edger saw which will produce chips of substantially uniform fibre length.

My invention not only aims to provide an edger saw which can have a faster feed, narrower kerf, and will produce a high percentage of chips of nearly uniform fibre length, but also an edger which produces smoother lumber, is cooler running, and requires less power.

With the above and yet additional objects and advantages in view and which will appear and be understood in the course of the following description and claims, the invention consists in the novel construction and in the adaptation and combination of parts hereinafter described and claimed.

In the accompanying drawings:

Figure 1 is a perspective view with parts broken away of a typical edger to which the saw of my invention can be applied.

Fig. 2 is a fragmentary side elevational view of the saw.

Fig. 3 is a fragmentary side elevational view of the saw illustrating in exaggerated scale the difference in radii of alternate teeth.

Fig. 4 is a fragmentary side elevational view of the saw with one of the teeth removed.

Figs. 5 and 6 are sectional views taken as indicated by the lines 5—5 and 6—6, respectively, of Fig. 4.

Fig. 7 is a side elevational view, partly broken away, of one of the longer insertable teeth.

Fig. 8 is a fragmentary side elevational view showing the tooth of Fig. 7 with a broken line adjacent the hook face to outline the hook face of the shorter teeth.

With reference being had to the drawings, the numeral 10 designates the saw blade for the insertable teeth. This blade is formed at equidistantly spaced intervals about the perimeter with an even number of shoulders 11, and there is provided between successive shoulders a tooth socket 12 (Fig. 4) and a gullet 13 separated by a respective radially tapered tongue 14. The socket is a generally parallel-sided re-entrant opening having its major axis more or less radial to the rotary axis of the blade and located immediately to the front of the shoulder. A slight rearward slope of the socket may be desirable to assure the related tongue adequate width for strength purposes between the inner end of the socket and the gullet in advance thereof without sacrificing gullet size. In fact, the gullet can be somewhat greater in depth than the socket and even larger than illustrated since its size and shape are not limited by the presence of camming shanks.

Each of the sockets has its front and rear walls bevelled to a V-shape in section for engagement in correspondingly shaped grooves 19 which are provided by insertable teeth 15 in the front and rear edges 16 and 17 of the latter's butt portion 18. Such front and rear walls of the socket are substantially straight except that the front wall is curved forwardly at the outer end and the back wall has a re-entrant arcuate shaped recess 20 located more or less opposite the curved tip.

The butt 18 of the teeth is formed to find a mating fit within the sockets 12, and in this regard, has a projection 21 at the rear adapted to lodge in the recess 20. Each tooth 15 jogs laterally at 22 to provide a cutting head and has relatively flat cheeks 23 which flare somewhat toward the cutting edge 24. Because the teeth 15 are self-anchoring, the cutting edge 24 can be shorter than is normally the case with the cutting edges of teeth held in place by camming shanks. Thus a narrower kerf is obtainable.

The teeth 15 are applied to a socket by hammering to force the projections 21 into the recess 20, forward-springing of the tongue 14 making this possible. It will be noted that the hook or underneath face 25 of the head of the tooth is so shaped that when the tooth is locked in operating position within the socket, the hook curvature merges with that of the tongue 14.

The sockets 12 have slots 26 communicating with their inner ends. When it is desired to remove a tooth, a pin is inserted in this slot and is levered against the tooth by means of a tool like or similar to that shown in U.S. Patent No. 1,455,968.

In Fig. 2, for clarity of terminology the hook angle, tooth angle, and back clearance have been identified. I have found that the tooth angle is critical in the practice of the present invention and should be no greater than the 30 degrees indicated. A hook angle of about 45 degrees gives very satisfactory results.

It is of utmost importance to understand that alternate of my saw teeth are purposely shortened about 1/32 inch, the longer teeth being designated 15L and the shorter teeth being denoted 15S. In Fig. 3 this difference of radius from the cutting edge of the teeth to the center of the saw has been exaggerated and shown by radii R1 and R2 for the teeth 15L and 15S, respectively. Other than for this difference in length, the teeth are identical. This is perhaps best shown in Fig. 8 wherein the broken line 25S indicates the hook face of these shorter teeth with relation to the hook face 25 of the longer teeth.

As shown in Fig. 1, most edgers in use have their feed rolls 40 so located that the wood slabs 41 are fed to the saws above the arbor. Thus, the egress point of each saw tooth from a pass through the slab is further from the arbor than the bite point, the travel path of the tooth in the wood between these points being modified from a true arc by the linear travel of the slab into the saw. The grain of the slab is longitudinal thereof and so increments of fibre are severed by the saw teeth, the length of these increments for a given saw and rim speed being a direct function of the feed speed of the slab. For best production it is perforce desirable that the feed speed be as great as possible.

When the saw teeth are the same length the kerf output is substantially sawdust. However, I found that when alternate teeth are shortened the short teeth continue to produce sawdust whereas the long teeth produce a very large percentage of chips of substantially uniform fibre length.

To give a specific example, a test saw with a 32 inch diameter was made having 20 teeth, alternate of which were $\frac{1}{32}$ inch shorter, and having a gullet depth of 3 inches. The tooth angle was 30 degrees and the back clearance and hook angle were 15 and 45 degrees, respectively. During the test the saw was driven at a rim speed of 10,000 ft./min. and the slab was fed thereto at a rate of 500 ft./min. Calculations will show that the longer teeth of such a saw make passes through the moving slab ½ inch apart longitudinally thereof and that the shorter teeth follow the longer teeth by 0.22 inch, leaving a 0.28 inch pass between a short tooth and the next following long tooth. Theoretically, then, 56% of the kerf material could be fibres over ¼ inch in length. A sample of the kerf output from a standard run of the above-described saw on hemlock was sifted through a chip classifier with the following results:

| | Percent |
|---|---|
| Retained on 1½" screen, ½ oz. | 1.19 |
| Retained on 1" screen, ½ oz. | 1.19 |
| Retained on ¾" screen, 1 oz. | 2.38 |
| Retained on ½" screen, 4.5 oz. | 10.71 |
| Retained on ¼" screen, 10 oz. | 23.80 |

The larger chips in this run occurred primarily from peeling at the bottom of the slab. At any rate, the very large percentage of chips retained on the ¼ inch screen proved the utility of my invention and showed a uniformity of chip output in close accordance with the theoretical. Also, of import is the fact that the side walls of the kerf in the slab were considerably smoother than is the case with a conventional edger saw. It is believed that this is aided by the shorter teeth.

It is thought that the invention will have been clearly understood from the foregoing detailed description of my now preferred illustrated embodiment. Changes in the details of construction will suggest themselves and it is accordingly my intention that no limitations be implied and that the hereto annexed claims be given a scope fully commensurate with the broadest interpretation to which the employed language fairly admits.

What I claim is:

1. A combination edger and chipper comprising, a power-drive edging saw having an even number of teeth each with a tooth angle at the tip of no greater than 30 degrees, alternate of said teeth having a slightly less radial distance from their tips to the rotary axis of the saw than the radial distance from the tips of the other half of the teeth to said axis, and power-driven feed means to feed wood into said saw with its fibre transverse to said rotary axis thereof and at a speed whereby the longer teeth of said saw bite into the fed wood at a bite interval of about one-half inch thereby producing chips while edging having a fibre length slightly longer than one-fourth inch.

2. An edger saw comprising, a circular blade having an even number of insertable-type teeth fitting by shanks into peripherally exposed sockets provided by the blade, alternate of said teeth having a slightly less radial distance from their cutting edges to the center of the blade than the radial distance from the cutting edges of the other half of the teeth to said axis, said teeth each having a tooth angle no greater than 30 degrees.

3. A combination edger and chipper comprising, a power-driven edger saw having an even number of teeth with alternate ones of said teeth having a slightly less radial distance from their tips to the rotary axis of the saw than the radial distance from the tips of the other half of the teeth to said axis, said teeth other than for said alternating high and low placement being approximately identical and being characterized in that the same have a substantial hook angle, and power-driven feed means to feed wood into said saw with its fibre transverse to said rotary axis of the saw and at a speed whereby the longer teeth of said saw bite into the fed wood at a bite interval of about one-half inch, thereby producing chips while edging having a fibre length slightly longer than one-fourth inch, each of said teeth having a tooth angle at the tip of no greater than 30 degrees.

References Cited in the file of this patent

UNITED STATES PATENTS

| 142,489 | McIntyre | Sept. 2, 1873 |
| 155,103 | Nichols et al. | Sept. 15, 1874 |
| 246,703 | Atkins | Sept. 6, 1881 |
| 343,713 | Kinney | June 15, 1886 |
| 2,696,229 | Drake | Dec. 7, 1954 |
| 2,717,012 | Schneider | Sept. 6, 1955 |
| 2,811,183 | Mottet | Oct. 29, 1957 |

FOREIGN PATENTS

| 1,139,202 | France | Feb. 11, 1957 |